(12) United States Patent
Woytowich et al.

(10) Patent No.: US 8,435,930 B2
(45) Date of Patent: *May 7, 2013

(54) LOW DENSITY CEMENTITIOUS COMPOSITIONS USING LIME KILN DUST

(75) Inventors: Wes Woytowich, Calgary (CA); Bill Carruthers, Montgomery, TX (US); Paul Lehoux, Kirkland (CA); Greg Daderko, Overland Park, KS (US)

(73) Assignee: LaFarge, Paris (FR)

( * ) Notice: Subject to any disclaimer, the term of this patent is extended or adjusted under 35 U.S.C. 154(b) by 53 days.

This patent is subject to a terminal disclaimer.

(21) Appl. No.: 13/182,789

(22) Filed: Jul. 14, 2011

(65) Prior Publication Data

US 2012/0012314 A1    Jan. 19, 2012

Related U.S. Application Data

(60) Provisional application No. 61/364,746, filed on Jul. 15, 2010.

(51) Int. Cl.
*E21B 33/00* (2006.01)
*C04B 38/08* (2006.01)
*C04B 18/06* (2006.01)

(52) U.S. Cl.
USPC .......... 507/269; 106/681; 106/793; 166/285

(58) Field of Classification Search .......... None
See application file for complete search history.

(56) References Cited

U.S. PATENT DOCUMENTS

| | | |
|---|---|---|
| 3,635,873 A | 1/1972 | Bertozzi |
| 3,790,518 A | 2/1974 | Shearing |
| 3,990,901 A | 11/1976 | Engstrom |
| 4,098,614 A | 7/1978 | Ray |
| 4,235,291 A | 11/1980 | Messenger |
| 4,252,193 A | 2/1981 | Powers |
| 4,684,407 A | 8/1987 | Umezawa |
| 4,762,561 A | 8/1988 | Holub |
| 4,906,298 A | 3/1990 | Natsuume |
| 4,981,731 A | 1/1991 | Yorita |
| 5,102,467 A | 4/1992 | Gartner |
| 5,281,270 A | 1/1994 | Totten |
| 5,339,902 A | 8/1994 | Harris |
| 5,349,118 A | 9/1994 | Davidovits |
| 5,484,019 A | 1/1996 | Griffith |
| 5,505,987 A | 4/1996 | Jennings |
| 5,531,825 A | 7/1996 | Gartner |
| 5,679,381 A | 10/1997 | Andersen |
| 5,753,036 A | 5/1998 | Hornaman |
| 5,916,483 A | 6/1999 | Burge |
| 5,976,240 A | 11/1999 | Vezza |
| 6,008,275 A | 12/1999 | Moreau |
| 6,060,535 A | 5/2000 | Villar |
| 6,145,591 A | 11/2000 | Boncan |
| 6,290,769 B1 | 9/2001 | Carkner |
| 6,310,143 B1 | 10/2001 | Vickers, Jr. |
| 6,437,027 B1 | 8/2002 | Isomura |
| 6,455,615 B2 | 9/2002 | Yu |
| 6,514,595 B1 | 2/2003 | Sprouts |
| 6,516,883 B1 | 2/2003 | Chatterji |
| 6,602,343 B1 | 8/2003 | Costa |
| 6,923,857 B2 | 8/2005 | Constantinou |
| 6,941,720 B2 | 9/2005 | DeFord |
| 7,044,170 B2 | 5/2006 | Goodwin |
| 7,174,962 B1 | 2/2007 | Roddy |
| 7,273,103 B2 | 9/2007 | Szymaski |
| 7,288,148 B2 | 10/2007 | Hicks |
| 7,388,045 B1 | 6/2008 | Lewis |
| 7,537,655 B2 * | 5/2009 | Abbate .................. 106/713 |
| 7,658,796 B2 | 2/2010 | Nordmeyer |
| 7,670,423 B2 | 3/2010 | Szymaski |
| 7,727,330 B2 | 6/2010 | Ordonez |
| 7,867,954 B2 * | 1/2011 | Warrender et al. .......... 507/269 |
| 2003/0127026 A1 | 7/2003 | Anderson |
| 2003/0144374 A1 | 7/2003 | Heathman |
| 2003/0150615 A1 | 8/2003 | Dao |
| 2003/0155124 A1 | 8/2003 | Nguyen |
| 2004/0149174 A1 | 8/2004 | Farrington |
| 2004/0187740 A1 * | 9/2004 | Timmons ................ 106/705 |
| 2004/0211342 A1 | 10/2004 | Sprouts |
| 2005/0139129 A1 | 6/2005 | Daczko |
| 2006/0054059 A1 | 3/2006 | Dubey |
| 2006/0054321 A1 | 3/2006 | Szymaski |
| 2006/0162930 A1 | 7/2006 | Gronsveld |
| 2007/0051278 A1 | 3/2007 | Wagh |
| 2007/0056734 A1 | 3/2007 | Roddy |
| 2007/0089643 A1 | 4/2007 | Roddy |
| 2007/0221378 A1 | 9/2007 | Brothers |
| 2007/0238621 A1 | 10/2007 | Roddy |
| 2007/0289744 A1 | 12/2007 | Bingamon |
| 2008/0057206 A1 | 3/2008 | Igo |
| 2008/0066655 A1 | 3/2008 | Fraser |

(Continued)

FOREIGN PATENT DOCUMENTS

| | | |
|---|---|---|
| WO | WO94/19172 | 1/1994 |
| WO | WO95/33606 | 12/1995 |

(Continued)

*Primary Examiner* — John J Figueroa
(74) *Attorney, Agent, or Firm* — Pillsbury Winthrop Shaw Pittman, LLP

(57) ABSTRACT

A manufactured cementitious binder including a hydraulic binder in an amount in the range of from about 40 to 75% by weight of the cementitious binder; metakaolin in an amount in the range of from about 1 to 30% by weight of the cementitious binder; silica fume in an amount up to about 15% by weight of the cementitious binder; lime kiln dust in an amount of from about 5 to 30% by weight of the cementitious binder, and a cementitious accelerator in an amount greater than about 0.1% by weight of the cementitious binder, wherein the cementitious binder provides a cementitious settable composition, when added with water and without a lightweight additive, that has a density lower than about 13 pounds per gallon and greater than about 11 pounds per gallon and a 24 hour compressive strength at 100 F, as hardened, of at least 500 psi.

26 Claims, No Drawings

U.S. PATENT DOCUMENTS

| | | |
|---|---|---|
| 2008/0099122 A1 | 5/2008 | Andersen |
| 2008/0156491 A1 | 7/2008 | Roddy |
| 2008/0202752 A1 | 8/2008 | Lopez |
| 2008/0271641 A1 | 11/2008 | Ko |
| 2008/0289542 A1 | 11/2008 | Ko |
| 2009/0038800 A1 | 2/2009 | Ravi |
| 2009/0038801 A1 | 2/2009 | Ravi |
| 2009/0054269 A1 | 2/2009 | Chatterji |
| 2009/0120329 A1 | 5/2009 | Kurz |
| 2009/0264557 A1 | 10/2009 | Lewis |
| 2009/0288830 A1 | 11/2009 | Perera |
| 2010/0044043 A1 | 2/2010 | Roddy |
| 2010/0190888 A1 | 7/2010 | Gaeberlein |
| 2010/0282466 A1 | 11/2010 | Brenneis |
| 2010/0294496 A1 | 11/2010 | Woytowich |
| 2012/0012314 A1* | 1/2012 | Woytowich et al. .......... 166/285 |
| 2012/0012315 A1* | 1/2012 | Woytowich et al. .......... 166/285 |

FOREIGN PATENT DOCUMENTS

| | | |
|---|---|---|
| WO | WO03/054346 | 7/2003 |
| WO | WO03/059838 | 7/2003 |
| WO | WO2007/053852 | 5/2007 |
| WO | WO2009/016230 | 2/2009 |
| WO | WO2009/074875 | 6/2009 |
| WO | WO2010/026155 | 3/2010 |
| WO | WO2010/044496 | 4/2010 |

* cited by examiner

LOW DENSITY CEMENTITIOUS COMPOSITIONS USING LIME KILN DUST

CROSS REFERENCE TO RELATED APPLICATION

This application claims priority and benefit under 35 U.S.C. §119(e) to U.S. Provisional Patent Application No. 61/364,746, entitled "Low Density Cementitious Compositions Using Lime Kiln Dust," filed on Jul. 15, 2010. The content of that application is incorporated herein in its entirety by reference.

FIELD

The present invention relates to cement, concrete and mortar compositions and, more particularly, to low density cementitious compositions.

BACKGROUND

Cementitious settable compositions are used in the treatment and drilling of well bores extending from the surface of the earth to subterranean formations. Generally, the drilling of a well for the recovery of oil, gas or water from a subterranean formation involves placing and securing a casing in the well bore by cementing. In this operation, cement is pumped downward from the surface of the earth to the bottom of the well. After the cement (i.e. the cementitious settable composition) has been pumped between the casing and the well, pumping is discontinued and the cement is permitted to set in place.

In cementing procedures in a well bore, it is sometimes desirable that the cement slurry has a low density. Aside from being costly due to a high ratio of cement to water, high density cement slurries require higher pumping pressures in order to place them at the desired positions in the well'bore. Further, high density cement slurries impose high static and dynamic pressures upon not only the formation to be treated but upon the other formations as well. At the locations where these other formations are porous, the high pressures exerted in the well bore can result in loss of the cement slurry into the formations or loss of the water from the cement slurry into the formations. As a result, the cement can set in an unintended position in the well bore. Thus, when designing cementitious settable compositions for subterranean applications, design engineers should ensure that the compositions provide adequate compressive strength and zonal isolation. Aside from providing strength and zonal isolation one should ensure that the selected compositions meet all regulatory guidelines for zonal isolation for the respective area. Another area of concern is to ensure that the cementitious composition selected to provide zonal isolation has the capability to be seen by down-hole interpretation methods (bond logs). Yet another area of concern from a manufacturing standpoint is to ensure that the cementitious composition remains uniform and that materials that are used as fillers do not impact the intended development of mechanical strengths and the rheological properties of the cementitious composition.

In order to obtain cement slurries having adequate mechanical and rheological properties and a density equal to or less than about 13 pounds per gallon, it is known in the art to use lightweight additives such as, for example, microspheres (e.g. glass beads) and foaming agents, as a partial substitute for water. However, the use of lightweight additives significantly adds undesirable costs as well as industrial challenges to the preparation of slurries. Lightweight additives are generally the most expensive materials in low density cementitious compositions. Further, the use of foaming agents or other similar chemicals for reducing the density of cement slurries may create hazards and pose environmental concerns.

SUMMARY

Therefore, it is desirable to provide lightweight cementitious settable compositions or cement slurries that exhibit enhanced compressive performances while having the highest possible water content. The high water content enables one to produce the lowest slurry weight, which then requires the lowest amount of lightweight additives to achieve the desired density. A lightweight additive is defined hereinafter as any material other than water that is used to provide a cement slurry that has a low density and desired mechanical and theological properties. Examples of lightweight additives include microspheres, foaming agents and the like. It will be appreciated that any microspheres, foaming agents and the like added to the composition or cement slurry in an amount not sufficient to provide a low density and desired mechanical and rheological properties would not be considered a lightweight additive.

Furthermore, it is desirable to provide lightweight cementitious settable compositions or cement slurries in which materials that are used as fillers do not compromise the development of mechanical strengths and the rheological properties of the compositions. It is believed that the impact of filler materials may become more important in lightweight cementitious settable compositions due to the high water content.

In particular, it, is desirable to provide lightweight cementitious settable compositions that exhibit enhanced compressive performances at densities lower than about 13 pounds per gallon (ppg) without using, or including a minimum amount of, lightweight additives such as microspheres, foaming agents or the like. Furthermore, it is desirable to provide cementitious settable compositions that exhibit enhanced compressive performances at densities equal to or lower than about 12 ppg, more preferably equal to or lower than about 11 ppg without using lightweight additives or including a reduced amount of lightweight additives such as microspheres, foaming agents or the like. In addition, it is desirable to provide cementitious settable compositions that exhibit enhanced compressive performances at densities equal to or lower than about 10 ppg, preferably equal to or lower than about 9 ppg, more preferably equal to or lower than about 8 ppg, including a minimum amount of, lightweight additives such as microspheres, foaming agents or the like.

In one aspect of the invention, there is provided a manufactured cementitious binder that includes a hydraulic binder and one or more materials having pozzolanic or non-pozzolanic properties and that exhibits a minimum of 500 psi compressive strength at 24 hours (24 h) when cured at 100 F. The manufactured cementitious binder produces a low density cementitious settable composition or slurry that has excellent oil well slurry properties such as very low fluid loss, very low segregation, good thickening time, good admixture response, good tensile strength and exceeds the safety standards set forth by the industry governing bodies without using, or using little amounts of, lightweight additives.

In one aspect of the invention, the cementitious binder produces a cementitious settable composition having a density of about 12 pounds per gallon with a 24 h compressive strength, when cured at 100 F, in the range of about 900 to 1000 psi without using lightweight additives such as microspheres, foaming agents or the like and that maintains the above slurry properties.

In one aspect of the invention, there is provided a manufactured cementitious binder including: a hydraulic binder in an amount in the range of from about 40 to 75% by weight of the cementitious binder; metakaolin in an amount in the range of from about 1 to 30% by weight of the cementitious binder; silica fume in an amount up to about 15% by weight of the cementitious binder; lime kiln dust in an amount of from about 5 to 30% by weight of the cementitious binder, and a cementitious accelerator in an amount greater than about 0.1% by weight of the cementitious binder, wherein the cementitious binder provides a cementitious settable composition, when added with water and without a lightweight additive, that has a density lower than about 13 pounds per gallon and greater than about 11 pounds per gallon and a 24 hour compressive strength at 100 F, as hardened, of at least 500 psi.

In one aspect of the invention, there is provided a cementitious settable composition including water; and a cementitious binder including a hydraulic binder in an amount in the range of from about 40 to 75% by weight of the cementitious binder; metakaolin in an amount in the range of from about 1 to 30% by weight of the cementitious binder; silica fume in an amount up to about 15% by weight of the cementitious binder; lime kiln dust in an amount of from about 5 to 30% by weight of the cementitious binder, and a cementitious accelerator in an amount greater than about 0.1% by weight of the cementitious binder, wherein, without a lightweight additive, the cementitious settable composition has a density lower than about 13 pounds per gallon and greater than about 11 pounds per gallon and a 24 hour compressive strength at 100 F, as hardened, of at least 500 psi.

In another aspect of the invention, there is provided a method of cementing including providing a cementitious settable composition including water; and a cementitious binder including a hydraulic binder in an amount in the range of from about 40 to 75% by weight of the cementitious binder; metakaolin in an amount in the range of from about 1 to 30% by weight of the cementitious binder; silica fume in an amount up to about 15% by weight of the cementitious binder; lime kiln dust in an amount of from about 5 to 30% by weight of the cementitious binder, and a cementitious accelerator in an amount greater than about 0.1% by weight of the cementitious binder, wherein, without a lightweight additive, the cementitious settable composition has a density lower than about 13 pounds per gallon and greater than about 11 pounds per gallon and a 24 hour compressive strength at 100 F, as hardened, of at least 500 psi; and introducing the cementitious settable composition into an underground formation.

DETAILED DESCRIPTION

Various aspects of the present invention relate to a manufactured cementitious binder, a method of manufacturing the cementitious binder, a cementitious settable composition (slurry) and a method of cementing. In accordance with one embodiment of the invention, the cementitious binder and/or cementitious settable composition may be used in a variety of applications including, for example, subterranean applications, surface applications and construction applications. Subterranean applications may include, for example, primary cementing, remedial cementing, and drilling operations. In primary cementing, for example, pipe strings such as casings and liners are cemented in well bores. Well bores may include oil well bores, gas well bores, water, well bores, geothermal well bores, and the like. In performing primary cementing, cement compositions are pumped into the space between the walls of a well bore and the exterior surface of the pipe string disposed therein. The cement composition is permitted to set in the space, thereby forming an annular sheath of hardened, substantially impermeable cement therein that substantially supports and positions the pipe string in the well bore and bonds the exterior surface of the pipe string to the walls of the well bore. Cement compositions are also used in plugging and abandonment operations as well as in remedial cementing operations such as plugging permeable zones or fractures in well bores, plugging cracks and holes in pipe strings, and the like.

In one aspect of the invention, the manufactured cementitious binder is configured to provide a lightweight cementitious settable composition that possesses rapid high compressive strength without using, or including a reduced amount of, lightweight additives such as microspheres, foaming agents or the like. These cementitious characteristics are particularly desirable in cementing operations for subterranean applications. Indeed, when a cementitious settable composition is injected into the well bore and placed in the zone that is to be cemented, it is desirable that the composition presents relatively low viscosity and has effectively constant rheological properties. Once it is in place, an ideal cementitious composition should rapidly develop high compressive strength.

Furthermore, as will be appreciated by one skilled in the art, there are numerous benefits provided by such a cementitious binder. For example, in addition to the significant cost reduction in manufacturing the binder and preparing the cementitious settable compositions, there will be no or little environmental concern or hazards associated with the preparation of the cementitious settable composition as it can be prepared by simply mixing the cementitious binder with water without using, or using a little amount of, lightweight additives.

In one embodiment of the invention, the cementitious binder provides a cementitious settable composition, when added with water, that has a density lower than about 13 pounds per gallon (ppg) and a 24 hour compressive strength at 100 F, as hardened, of at least 500 psi, preferably at least 700 psi, more preferably, at least 800 psi, and more preferably at least 900 psi without using lightweight additives such as microspheres, foaming agents or the like. In yet another embodiment of the invention, the cementitious binder provides a cementitious settable composition that has a density lower than about 12 pounds per gallon, that has a 24 hour compressive strength at 100 F, as hardened, of at least 500 psi, preferably at least 700 psi, more preferably at least 800 psi, and more preferably at least 900 psi without using lightweight additives such as microspheres, foaming agents or the like. In yet another embodiment of the invention, the cementitious binder provides a cementitious settable composition that has a density lower than about 11 pounds per gallon, that has a 24 hour compressive strength at 100 F, as hardened, of at least 500 psi, preferably at least 700 psi, without using, or including a reduced amount of, lightweight additives such as microspheres, foaming agents or the like. In yet another embodiment of the invention, the cementitious binder provides a cementitious settable composition that has a density lower than about 10 pounds per gallon, has a 24 hour compressive strength at 100 F, as hardened, of at least 350 psi, preferably at least 500 psi, more preferably at least 700 psi, more preferably at least 800 psi, and even more preferably at least 900 psi, including a reduced amount of, lightweight additives such as microspheres, foaming agents or the like. In yet another embodiment of the invention, the cementitious binder provides a cementitious settable composition that has a density lower than about 9 pounds per gallon, that has a 24 hour compressive strength at 100 F, as hardened, of at least 350 psi, preferably at least 500 psi, more preferably at least 700 psi, more preferably at least 800 psi, and even more preferably at least 900 psi, including a reduced amount of, lightweight additives such as microspheres, foaming agents or the like. In yet another embodiment of the invention, the cementitious binder provides a cementitious settable composition that has a density lower than about 8 pounds per gallon, has a 24 hour compressive strength at 100 F, as hardened, of at least 350 psi, preferably at least 500 psi, more preferably at least 700 psi, more preferably at least 800 psi, and even more preferably at least 900 psi, including a reduced amount of lightweight additives such as microspheres, foaming agents or the like.

The inventors have devised that such lightweight cementitious settable compositions, which rapidly possess high compressive strength, for example, a 24 hour compressive strength at 100 F, as hardened, of at least 500 psi, preferably at least 700 psi, more preferably at least 800 psi, and more preferably at least 900 psi, without using, or including a reduced amount of, lightweight additives such as microspheres, foaming agents or the like, can be surprisingly obtained with a cementitious binder including a hydraulic cement, metakaolin, optionally silica fume, lime kiln dust, and a cementitious accelerator.

For example, in one embodiment of the invention, the manufactured cementitious binder includes a hydraulic binder in an amount in the range of from about 40 to 75% by weight of the cementitious binder; metakaolin in an amount in the range of from about 1 to 30% by weight of the cementitious binder; silica fume in an amount up to about 15% by weight of the cementitious binder; lime kiln dust in an amount of from about 5 to 30% by weight of the cementitious binder, and a cementitious accelerator in an amount greater than about 0.1% by weight of the cementitious binder, wherein the cementitious binder provides a cementitious settable composition, when added with water and without a lightweight additive, that has a density lower than about 13 pounds per gallon and greater than about 11 pounds per gallon and a 24 hour compressive strength at 100 F, as hardened, of at least 500 psi.

In the following embodiments discussed hereinafter, compressive strength measurements (at 24 hours, 100 F and 72 hours, 140 F) are performed in accordance with the standard defined by API Specification 10A, Sec 7, 9.

It has been found that lime kiln dust present in an amount of at least about 5% by weight of the cementitious binder, significantly enhances the performances of low density settable cementitious compositions. The inventors have devised that by incorporating lime kiln dust having selected ingredients in a predefined amount in the cementitious binder, it is possible to significantly enhance the performances of low density settable cementitious compositions without using, or using reduced amounts, of lightweight additives. In addition, the inventors have devised that the use of such lime kiln dust in combination with additional materials including metakaolin, a hydraulic binder, optionally silica fume and a cementitious accelerator in predefined amounts by weight of the cementitious binder also significantly enhances the performances of low density settable cementitious compositions. The performances of low density settable cementitious compositions, as defined herein, include, for example, rapid high compressive strength at 24 h (i.e. at least 500 psi at 100 F for a cementitious settable composition having a density lower than about 13 ppg) without using, or including a minimum amount of, lightweight additives such as microspheres, foaming agents or the like.

One skilled in the art will appreciate that the acceleration of strength development and reduced shrinkage of the settable cementitious composition is particularly beneficial for low density settable cementitious compositions that are used in subterranean applications. For example, it is desirable that low density settable cementitious compositions used in well bore applications develop early compressive strength to obtain good well bore isolation and/or maintain mechanical integrity of the well bore. In addition, the normal shrinkage of cement can pose problems during cementing in oil and gas wells. Shrinkage can play a major role in the long-term cemented annular isolation. The long term seal of the annulus is jeopardized if the set cement pulls away from the pipe, casing, or from the well bore. It is thus desirable to carefully control shrinkage.

Lime kiln dust (LKD) is a residual by-product material that is generated during the manufacture of lime. This by-product material is a partially calcined lime-kiln feed which contains fine-grained, solid, highly alkaline, calcined and uncalcined calcium and/or magnesium carbonate. In accordance with various embodiments of the invention, lime kiln dust is used as a filler to prepare low density cementitious compositions.

During the production of lime, lime kiln dust is carried by hot gasses in a lime kiln and collected by a filter system. The filter system can include electrostatic precipitators or baghouses to recover the lime kiln dust. The chemical analysis of lime kiln dust from various lime manufacturers varies depending on a number of factors, including the particular limestone or dolomitic limestone feed, the type of kiln, the mode of operation of the kiln, the efficiencies of the lime production operation, and the associated filter systems. Lime kiln dust collected by the filter system of the lime plant generally includes varying amounts of free lime and free magnesium, limestone and/or dolomitic limestone and variety of oxides, such as $SO_3$, $Na_2O$, and $K_2O$ and other components like chlorides.

For the purpose of illustration, Table 1 shows the chemical analysis of lime kiln dust generated by two different plants (LKD site 1 plant and LKD site 2 plant that manufacture lime). In Table 1, some of the materials present in the lime kiln dust are given. LOI refers to Loss on Ignition and fCaO refers to Free Lime.

TABLE 1

| Element | LKD Sample #1 | LKD Sample #2 |
|---|---|---|
| $SiO_2$ | 2.19 | 4.86 |
| $Al_2O_3$ | 0.67 | 1.24 |
| $Fe_2O_3$ | 0.28 | 1.44 |
| CaO | 65.22 | 59.62 |
| MgO | 1.60 | 8.98 |
| $SO_3$ | 0.41 | 6.07 |
| $Na_2O$ | 0.02 | 0.08 |
| $K_2O$ | 0.11 | 0.15 |
| $P_2O_5$ | 0.00 | 0.02 |
| $TiO_2$ | 0.03 | 0.06 |
| Alkali | 0.09 | 0.18 |
| LOI | 29.47 | 17.50 |
| Total | 100.00 | 100.02 |
| fCaO | 46.8 | 12.2 |
| Cl | 0.005 | 0.164 |

As can be seen in Table 1, the content of various components within the lime kiln dust can vary significantly depending on how the kiln operates and the location where the ingredients of the premix are collected (LKD site 0.1 or LKD site 2) and the type of kiln that is used to manufacture the lime. In one embodiment of the invention, the lime kiln dust is selected in the cementitious binder based on its content of selected ingredients (for example, chlorine or other ingredients). In particular, in one embodiment, the lime kiln dust is selected and added in the cementitious binder to provide the desired compressive strength and/or density.

As also shown in Table 1, lime kiln dust may include a significant amount of free lime. It is believed that the presence of free lime in lime kiln dust provides significant benefits over conventional fillers because free lime, due to its expansive characteristics, can reduce shrinkage of the settable cementitious composition. As noted previously, this is particularly beneficial for low density settable cementitious compositions that are used in subterranean applications. In one embodiment of the invention, the content of free lime in lime kiln dust is greater than 5%, for example greater than 10% in one embodiment, for example greater than 20% in one embodiment, for example greater than 30% in one embodiment, for example greater than 40% in one embodiment, for example greater than 50% in one embodiment, for example greater than 60% in one embodiment, for example greater than 70% in one embodiment, for example greater than 80% in one embodiment, for example greater than 90% in one embodiment.

The amount of various components in the lime kiln dust can be controlled and/or selected in one embodiment of the invention by varying the raw ingredients fed to the kiln assembly. For example, it will be appreciated that the chemical composition of these ingredients can differ depending on the geological locations where they are collected. As a result, the constituents, and their relative amounts by weight, in the lime kiln dust can differ depending on the geological locations where the raw ingredients are collected. In one embodiment, the raw materials, proportion targets and fineness targets are modified to obtain the mineralogy and chemical composition.

In another embodiment, the amount of various components in the lime kiln dust can be controlled by the dust filter system or by selectively purging the dust system.

In accordance with one embodiment of the invention, the cementitious binder includes lime kiln dust in an amount in the range of from about 5 to 30% by weight of the cementitious binder, when added with water, that has a density lower than about 12 pounds per gallon and a 24 hour compressive strength at 100 F; as hardened, of at least 500 psi without using lightweight additives such as microspheres, foaming agents or the like. Preferably, in an embodiment, the amount of lime kiln dust is present in about 10 to 25%.

The cementitious binder, according to one embodiment of the invention, may further include a hydraulic binder. Examples of hydraulic binders that could be used in embodiments of the invention are, but not limited to, Portland cements, blended cements, masonry cements compliant with ASTM and/or AASHTO specifications as well as API compliant cements. The inventors have devised that the high fineness of some cements enhance water retention and strength development of the cementitious settable composition. It is desirable to control the amount of hydraulic binder in the cementitious binder to achieve early high compressive strength for low density cementitious settable compositions. The cementitious binder includes a hydraulic cement in an amount in the range of 40 to 75%.

Preferably, in one embodiment of the invention, the cementitious binder further includes metakaolin in an amount in the range of from about 1 to 30% by weight of the cementitious binder. Preferably, in one embodiment of the invention, metakaolin is present in the cementitious binder in an amount in the range of from about 8 to 25% by weight of the cementitious binder. More preferably, in one embodiment of the invention, metakaolin is present in the cementitious binder in an amount in the range of from about 8 to 18% by weight of the cementitious binder.

Metakaolin acts as a pozzolanic material in the cementitious binder and should preferably have an average particle size lower than about 3 µm, preferably lower than about 1.7 µm. A pozzolanic material is a siliceous or aluminosiliceous material that possesses little or no cementitious value, but will, in the presence of water and in finely divided form, chemically react with the calcium hydroxide produced during the hydration of Portland cement to form materials with cementitious properties. It has been found that cementitious binders including metakaolin, which has a small particle size, significantly enhance the early compressive strength of cementitious settable compositions having a density lower than about 13 ppg, preferably lower than 10 ppg.

In other embodiments of the invention, it is envisioned that other types of pozzolanic materials could be used in addition to or instead of metakaolin.

For example, in one embodiment of the invention, the cementitious binder may also include silica fume in an amount up to about 15% by weight of the cementitious binder. Silica fume is a by-product formed in the production of silicon or ferro-silicon alloys and is collected by filtration of gases leaving the electric arc furnace. Typically it contains at least 75%, by weight, of silicon dioxide and consists of very fine spherical particles less than about 0.1 µm.

It has been determined that, due to its very high surface area, a small amount of silica fume was beneficial in obtaining cementitious settable compositions having low free fluid and segregation. In addition, it has been determined that high surface area materials such as silica fume and diatomaceous earth produce synergistic effects with other ultra fine materials that enhance early (e.g. 24 h) compressive strengths for low density cementitious settable compositions.

The cementitious composition also includes a cementitious accelerator to accelerate hydration. A cementitious accelerator is defined herein as any admixture(s) that is/are added to the binder and is/are adapted to accelerate hydration of the cementitious composition in a controlled manner. As will be appreciated by one skilled in the art, controlling hydration of the cementitious composition is desirable to obtain the intended mechanical and rheological properties. Thus, according to various embodiments of the invention, the cementitious accelerator is selected and added to the cementitious composition in a controlled amount to accelerate hydration. The cementitious accelerator defined herein and encompassed by various embodiments of the invention departs from chemical(s) and/or component(s) present in other products (e.g. by-products), which chemical(s) and/or component(s) may exhibit accelerating properties in some circumstances but are not provided in a controlled amount to the composition. For example, the cementitious accelerator defined herein departs from chlorides and/or alkalies that might be present in lime kiln dust or in cement kiln dust, which might be added to the cementitious composition in one embodiment. As will be appreciated by one skilled in the art, chlorides and/or alkalies present in the cement kiln dust may significantly vary depending on, for example, the raw ingredients fed to the kiln assembly, the type of fuels and raw materials that are used in the burner assembly of the cement kiln and the operation of the dust filter that collects the cement kiln dust.

The cementitious accelerator can be separately added during or after co-grinding and/or blending the various elements of the cementitious binder. For example, the cementitious accelerator can be added at the time of preparing the slurry. Thus, the cementitious accelerator can be added to the mixture including hydraulic binder, metakaolin, optional silica fume and LKD at the time of preparing the slurry.

Examples of suitable cementitious accelerators are, but not limited to, a source of chlorides in which chlorides are provided in a controlled amount, triethanolamine, sodium thiocyanate, calcium formate, calcium nitrite, calcium nitrate, alkali salts, non chloride based accelerators such as Grace Construction Products Polarset® or any combination thereof. This is not limiting. Additional cementitious accelerators may be used in other embodiments of the invention. The cementitious binder includes an accelerator in an amount of at least 0.1%. For example, in one embodiment, the accelerator is in an amount from about 0.5% to 4% by weight of the cementitious binder. In yet another embodiment, the accelerator is preferably in an amount from 0.6% to 3%. In yet another embodiment, the accelerator is preferably in an amount from 0.8% to 2.5%.

The lightweight cementitious settable compositions of embodiments of the invention exhibit enhanced compressive performances at densities lower than about 13 pounds per gallon (ppg) without using, or including a minimum amount of, lightweight additives such as microspheres, foaming agents or the like. In particular, the cementitious binder provides a cementitious settable composition, when only water is added, that has a density lower than about 12 pounds per gallon and a 24 hour compressive strength at 100 F, as hardened, of at least 500 psi. The water used in the cementitious settable compositions of embodiments of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the cementitious settable composition. In some embodiments, the water may be included in an amount sufficient to form a pumpable slurry. In some embodiments, the water may be included in the cementitious settable compositions of embodiments of the present invention in an amount in the range of from about 40% to about 200% by weight. As used herein, the term "by weight," when used herein to refer to the percent of a component in the cementitious settable composition, means by weight included in the cementitious settable compositions of the present invention relative to the weight of the dry components in the cementitious settable composition. In some embodiments, the water may be included in an amount in the range of from about 40% to about 150% by weight.

Cementitious settable compositions of embodiments of the invention having a density lower than about 10 pounds per gallon and a 24 hour compressive strength at 100 F, as hardened, of at least 500 psi can be obtained by using a reduced amount of lightweight additives, such as microspheres. The higher strength and good slurry properties obtained by the cementitious settable composition of this embodiment at 12 ppg and 13 ppg enables slurry density decrease by increasing the water content (while maintaining acceptable slurry properties). A formulation of ultralight cementitious settable composition (e.g. 10 ppg, 9 ppg and 8 ppg) is done by first determining the water content required to achieve a desired compressive strength in a cementitious settable composition without lightweight additives such as microspheres. The required amount of light weight additives (e.g. microspheres) is then calculated to achieve the target weight of the cementitious settable composition. Up to a certain content, the lightweight additives, such as microspheres, are considered as fillers that have minimal impact on water content and rheology and therefore will maintain any designed target strength.

A variety of microspheres may be utilized in accordance with embodiments of the present invention, including hollow, solid, and/or porous microspheres. Suitable microspheres may include a variety of materials, including, but not limited to, microspheres that comprise glass, soda lime borosilicate glass, fly ash, ceramic, polystyrene, other polymeric materials, and mixtures thereof. In some embodiments of the lightweight cementitious settable compositions of the present invention, the microspheres are hollow, glass microspheres. In some embodiments, the microspheres may comprise a crosslinked polymeric material, such as polystyrene crosslinked with divinyl benzene (e.g., plastic beads). The microspheres may be obtained from any suitable source. Examples of suitable fly ash microspheres are commercially available from Halliburton Energy Services, Inc., Duncan, Okla., under the tradename SPHERELITE™ microspheres. Suitable hollow, soda lime borosilicate glass microspheres include 3M™ SCOTCHLITE™ glass bubbles. In a preferred embodiment, borosilicate glass microspheres (3M™ beads) produced by the 3M™ company can be beneficially used to produce lightweight cementitious settable compositions that produce enhanced 24 h compressing strengths.

In one embodiment of the invention, the microspheres may be added in the cement finish mill, in the cement separator, in the cement cooler or by using a separate blender from the cement grinding operation. In these embodiments, the resulting premix would include microspheres before being delivered to the user. Alternatively, in another embodiment, microspheres may be blended with the cementitious binder/premix by the user to further lower the density of the cementitious settable composition, for example, to obtain a density lower than about 10 ppg, or lower than about 9 ppg (for example about 8 ppg).

It is envisioned in one embodiment of the invention to foam the cementitious settable composition with a gas to further lower its density. The gas used in the foamed settable compositions according to embodiments of the present invention may be any gas suitable for foaming a settable composition, including, but not limited to, air, nitrogen, or combinations thereof. Generally, the gas should be present in the foamed cementitious settable compositions according to embodiments of the present invention in an amount sufficient to form the desired foam. The cementitious settable compositions of embodiments of the present invention further include a surfactant. In some embodiments, the surfactant includes a foaming and stabilizing surfactant composition to facilitate the foaming of a cementitious settable composition and to stabilize the resultant foamed cementitious settable composition formed therewith. Any suitable foaming and stabilizing surfactant composition may be used in the cementitious settable compositions according to embodiments of the present invention.

Embodiments of the present invention will be further illustrated in more detail using the following, but not limitative, examples. A series of sample settable cementitious compositions were prepared at room temperature and subjected to 24 hour compressive strength tests at 100 F.

Referring to Table 2, this table presents results obtained on cementitious compositions that do not contain lightweight additives such as microspheres. As can be seen in Table 2, addition of chlorides clearly enhances the strength development (examples R85-1 and R85-3 and examples R85-2 and R85-4). The impact of alkalies is also clearly underlined by the test results (examples R85-3 and R85-5 and examples R85-4 and R85-6). As can also be seen in Table 2, lightweight cementitious compositions (less than 12 ppg) can be obtained with very good strength development, without using any lightweight additives such as microspheres. In Table 2, "TIII cement" refers to a type III Portland cement.

TABLE 2

| Designed PPG | | 12 ppg | | | | | | | |
|---|---|---|---|---|---|---|---|---|---|
| PPG (Cube Wt) | | 12.1 | 12.0 | 11.9 | 12.3 | 12.1 | 12.2 | 12.3 | 12.3 |
| Test No. | | R85-1 | R85-3 | R85-5 | R85-7A | R85-2 | R85-4 | R85-6 | R85-7 |
| Accelerator 1 (Chloride based) | | 1 | 1 | 1 | 1 | | 1 | 1 | 1 |
| Accelerator 2 (Alkali based) | | | | 1 | 1 | | | 1 | 1 |
| % TIII Cement | | 62 | 62 | 62 | 64 | 62 | 62 | 62 | 64 |
| % Metakaolin | | 12 | 12 | 12 | 12 | 12 | 12 | 12 | 12 |
| % LKD #1 | | 23 | 22 | 21 | 19 | | | | |
| % LKD #2 | | — | — | — | — | 23 | 22 | 21 | 19 |
| % silica fume | | 3 | 3 | 3 | 3 | 3 | 3 | 3 | 3 |
| Lightweight Additive | % added to cmtious as % in final Blend | 0 | 0 | 0 | 0 | 0 | 0 | 0 | 0 |
| % Water | | 52.4% | 52.4% | 52.4% | 52.2% | 53.7% | 53.7% | 53.6% | 52.8% |
| Strength (24 hr/100 F.) | | 301 | 625 | 779 | 762 | 393 | 730 | 877 | 916 |

Table 3 shows the performance of a lightweight composition having a density of about 10 ppg prepared with lightweight additives. The composition shows a compressive strength greater than 500 psi. In table 3, $CaCl_2$ and $K_2SO_4$ are used as cementitious accelerator.

TABLE 3

| Designed PPG | | 10 | |
|---|---|---|---|
| PPG (Cube Wt) | | | |
| Test No. | | R85-8 | R85-9 |
| Accelerator 1 (Chloride based) | | 1 | 1 |
| Accelerator 2 (Alkali based) | | 1 | 1 |
| % TIII Cement | | 64 | 62 |
| % Metakaolin | | 12 | 12 |
| % LKD #1 | | 19 | |
| % LKD #2 | | — | 21 |
| % silica fume | | 3 | 3 |
| Lightweight Additive | % added to cmtious as % in final Blend | 13.3 11.8 | 14.4 12.6 |
| % Water | | 52.9% | 53.8% |
| Strength (24 hr/100 F.) | | 585 | 573 |

The cementitious settable compositions according to embodiments of the invention may be used in a variety of applications. For example, the cementitious settable compositions may be used in primary cementing, remedial cementing, and drilling operations.

In accordance with one embodiment of the invention, the cementitious settable composition is introduced in the underground formation in a well bore between a casing and a wall of the well bore to perform primary cementing. In another embodiment, the cementitious settable composition may be introduced in the underground formation to repair the casing and/or to achieve zonal isolation. For example, the cementitious settable composition may be used for purposes including, but not limited to, sealing off perforations, repairing casing leaks (including leaks from damaged areas of the casing), plugging back or sealing off the lower section of a wellbore, and sealing the interior of a wellbore during abandonment operations. Examples of specific applications include, but are not limited to, cementing casing and liner strings, inflatable packers, squeezing perforations and casing leaks.

It is also envisioned in other embodiments of the invention to use the cementitious settable compositions in applications other than subterranean applications. For example, the cementitious settable compositions may be used in construction cementing where compositions having low densities and enhanced compressive strengths are desired. However, this is not limiting. For example, it is also envisioned in one embodiment of the invention to use the binder to prepare settable compositions at densities greater than about 13 ppg for use in a variety of applications, including surface applications and construction applications.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A manufactured cementitious binder comprising:
   a hydraulic binder in an amount in the range of from about 40 to 75% by weight of the cementitious binder;
   metakaolin in an amount in the range of from about 1 to 30% by weight of the cementitious binder;
   silica fume in an amount up to about 15% by weight of the cementitious binder;
   lime kiln dust in an amount of from about 5 to 30% by weight of the cementitious binder, and
   a cementitious accelerator in an amount greater than about 0.1% by weight of the cementitious binder,
   the cementitious binder providing a cementitious settable composition when added with water, wherein for a density lower than about 13 pounds per gallon and of at least 11 pounds per gallon obtained without a lightweight additive, said cementitious settable composition exhibits a 24 hour compressive strength at 100 F, as hardened, of at least 500 psi.

2. The binder of claim 1, wherein the settable composition has a 24 hour compressive strength at 100 F, as hardened, of at least 700 psi.

3. The binder of claim 2, wherein the settable composition has a 24 hour compressive strength at 100 F, as hardened, of at least 800 psi.

4. The binder of claim 1, wherein the cementitious accelerator is in an amount from 0.5% to 3% by weight of the cementitious binder.

5. The binder of claim 1, wherein lime kiln dust includes free lime in an amount greater than 5% by weight of lime kiln dust.

6. The binder of claim 1, comprising microspheres in an amount less than about 16% by weight of the cementitious binder, wherein the cementitious binder provides a cementitious settable composition, when added with water, that has a density lower than about 11 pounds per gallon and a 24 hour compressive strength at 100 F, as hardened, of at least 500 psi.

7. The binder of claim 6, wherein the cementitious settable composition has a density of about 10 pounds per gallon.

8. The binder of claim 7, wherein the settable composition has a 24 hour compressive strength at 100 F, as hardened, of at least 700 psi.

9. The binder of claim 1, comprising microspheres in an amount less than about 35% by weight of the cementitious binder, wherein the cementitious binder provides a cementitious settable composition, when added with water, that has a density of about 8 pounds per gallon and a 24 hour compressive strength at 100 F, as hardened, of at least 500 psi.

10. The binder of claim 1, wherein metakaolin is present in the cementitious binder in an amount in the range of from about 8 to 25% by weight of the cementitious binder.

11. The binder of claim 1, wherein lime kiln dust is in an amount of from about 10 to 25% by weight of the cementitious binder.

12. A cementitious settable composition comprising:
   water; and
   a cementitious binder including
      a hydraulic binder in an amount in the range of from about 40 to 75% by weight of the cementitious binder;
      metakaolin in an amount in the range of from about 1 to 30% by weight of the cementitious binder;
      silica fume in an amount up to about 15% by weight of the cementitious binder;
      lime kiln dust in an amount of from about 5 to 30% by weight of the cementitious binder, and
      a cementitious accelerator in an amount greater than about 0.1% by weight of the cementitious binder,
   wherein, without a lightweight additive, the cementitious settable composition has a density lower than about 13 pounds per gallon and of at least 11 pounds per gallon and a 24 hour compressive strength at 100 F, as hardened, of at least 500 psi.

13. The composition of claim 12, wherein the settable composition has a 24 hour compressive strength at 100 F, as hardened, of at least 700 psi.

14. The composition of claim 12, wherein the cementitious binder comprises microspheres in an amount less than about 16% by weight of the cementitious binder, wherein the cementitious settable composition has a density lower than about 11 pounds per gallon and a 24 hour compressive strength at 100 F, as hardened, of at least 500 psi.

15. The composition of claim 14, wherein the settable composition has a density of about 10 pounds per gallon.

16. A manufactured cementitious binder comprising:
   a hydraulic binder in an amount in the range of from about 40 to 75% by weight of the cementitious binder;
   metakaolin in an amount in the range of from about 1 to 30% by weight of the cementitious binder;
   silica fume in an amount up to about 15% by weight of the cementitious binder;
   lime kiln dust in an amount of from about 5 to 30% by weight of the cementitious binder, and
   a cementitious accelerator in an amount greater than about 0.1% by weight of the cementitious binder.

17. The binder of claim 16, wherein the cementitious accelerator is in an amount from 0.5% to 3% by weight of the cementitious binder.

18. The binder of claim 16, comprising microspheres in an amount less than about 16% by weight of the cementitious binder.

19. The binder of claim 16, wherein metakaolin is present in the cementitious binder in an amount in the range of from about 8 to 25% by weight of the cementitious binder.

20. The binder of claim 16, wherein lime kiln dust is in an amount of from about 10 to 25% by weight of the cementitious binder.

21. The binder of claim 16, wherein silica fume in an amount of about 3% by weight of the cementitious binder.

22. A method of cementing comprising:
   providing a cementitious settable composition comprising:
      water; and
      a cementitious binder including
         a hydraulic binder in an amount in the range of from about 40 to 75% by weight of the cementitious binder;
         metakaolin in an amount in the range of from about 1 to 30% by weight of the cementitious binder;
         silica fume in an amount up to about 15% by weight of the cementitious binder;
         lime kiln dust in an amount of from about 5 to 30% by weight of the cementitious binder, and
         a cementitious accelerator in an amount greater than about 0.1% by weight of the cementitious binder,
      wherein, without a lightweight additive, the cementitious settable composition has a density lower than about 13 pounds per gallon and of at least 11 pounds per gallon and a 24 hour compressive strength at 100 F, as hardened, of at least 500 psi; and
   introducing the cementitious settable composition into an underground formation.

23. The method of claim 22, wherein the settable composition has a 24 hour compressive strength at 100 F, as hardened, of at least 700 psi.

24. The method of claim 22, wherein the cementitious binder comprises microspheres in an amount less than about 16% by weight of the cementitious binder, wherein the cementitious binder provides a cementitious settable composition, when added with water, that has a density lower than about 11 pounds per gallon and a 24 hour compressive strength at 100 F, as hardened, of at least 500 psi.

25. The method of claim 22, wherein the underground formation is a well bore.

26. The method of claim 22, wherein lime kiln dust is in an amount of from about 10 to 25% by weight of the cementitious binder.

* * * * *